Patented Oct. 20, 1942

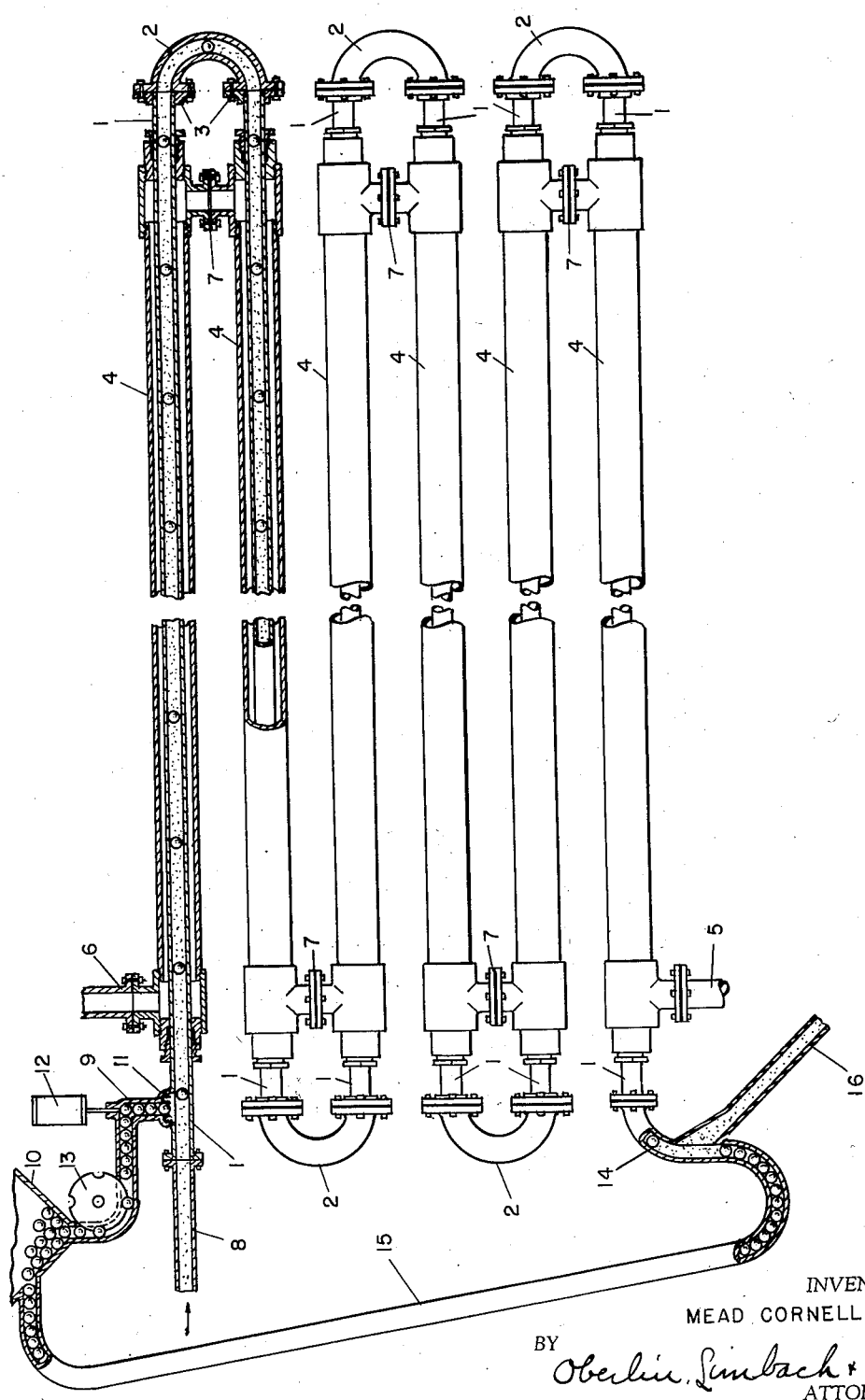

2,299,307

UNITED STATES PATENT OFFICE 2,299,307

METHOD OF AND APPARATUS FOR TREATING MATERIALS

Mead Cornell, Cleveland, Ohio, assignor to The Cornell Machine Company, Cleveland, Ohio, a corporation of Ohio Application February 2, 1940, Serial No. 317,002

4 Claims. (Cl. 252—32)

This invention relates as indicated to a method of and apparatus for treating materials, and more especially to the treatment of flowable materials of such character that a stream thereof may be caused to flow through an elongated passage.

When a stream of flowable material is caused to move through a restricted conduit of any substantial length, the characteristics of such stream will be determined largely by the characteristic of the material in the stream. When the material is a fluid, either liquid or gaseous, the stream will be found to have its greatest velocity at the center thereof progressively decreasing until, in that portion of the stream which occurs as a relatively thin film on the inner wall of the conduit, there is substantially no, or at the most very little, relative movement between it and the conduit wall. This normal occurrence is particularly objectionable if it is desired to establish a heat transfer to, or from, the material being treated through the wall of the conduit. In many instances, this layer of stationary or substantially stationary material lying on the inner surface of the conduit is a far greater thermal barrier than is the wall of the conduit itself. If such film or layer can be disrupted, the efficiency of heat transfer means of this character can be very substantially increased.

When a material being treated is caused to flow through a restricted conduit of any substantial length, and the material during such flow undergoes any substantial change in viscosity due, as for example, to a change in temperature, chemical reaction etc., the adherent film or layer reduces the effective cross-section of the conduit; causes segregation; interferes with the passage through the conduit of the desirable amount of material per unit of time; and additionally, in many instances, interferes with heat transfer through the wall of the conduit in the manner above explained.

When a stream of gas is caused to pass through a conduit, such stream will also be found to have the velocity characteristics at different points on its cross-section, as above explained in connection with the consideration of a liquid stream. When it is sought to transfer heat to or from the gas stream through the conduit wall, the layer of adherent gas on the inner surface of the conduit wall acts as an effective barrier to heat transfer in either direction.

It is a principal object of my invention to provide a method of and apparatus for treating materials which will overcome the objections above outlined.

If a mass of fluid material, particularly, a liquid, comprising a plurality of constituents, and especially when one of such constituents is present in very small amounts, is caused to flow through a restricted conduit, there is a tendency for some mixing or blending to occur. However, unless some means is provided for breaking up the adherent film on the inner surface of the conduit, or more particularly to disrupt the normal streamline flow of the material, mixing can only be accomplished if extremely high velocities are imparted to the stream of flowable material. The high velocity is necessary in order that it may, in effect, cause turbulence, i. e. breaking up the normal streamline flow of the material.

To impart a sufficiently high velocity so as to cause turbulent flow is, with many materials, impractical, and with many others, uneconomical. It is a further object of my invention, therefore, to provide a method of and apparatus for treating material whereby a turbulent flow of the material in a conduit may be secured without resorting to the high velocities heretofore employed in effecting such, and the feature of my invention, which results in the establishment of turbulent flow, is also of utility in cases where it is desirable to reduce the particle size, for example, of solid constituents in the stream of material being treated. Under ordinary conditions of flow, and particularly when streamline flow is permitted to occur, the solid particles entrained in the stream are carried along therewith without much disturbance, and without very materially breaking up such particles, especially if they are of small size as compared to the diameter of the stream.

Now, with my improved method and apparatus, I am able, at low velocities, to impart turbulent flow on the order of that which can be secured only by extremely high, and in many cases, impractical velocities when ordinary means and methods are employed. This establishment of a high degree of turbulent flow at low velocities makes possible a very substantial reduction in particle size at low cost in a stream being passed through a conduit.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative however of but a few of the various ways in which the principle of the invention may be employed.

In said annexed drawing, there is illustrated a broken side elevational view partially in section of one form of apparatus constructed in accordance with the principles of my invention, and which may be employed in carrying out the process of my invention.

Referring now more specifically to the drawing, it will be noted that the apparatus consists of a length of tubing through which the material to be treated is caused to flow. In order to conserve space, such tube is rebent, and in portions of its extent, it is provided with a jacket for the introduction of a cooling medium by which heat may be abstracted from the material in such tubing.

The continuous tube above referred to comprises a plurality of straight sections 1 interconnected by means of elbows 2, the connection between the elbows and straight sections of tube being effected by flanged members bolted together. As most clearly illustrated in the upper right-hand corner of the drawing, the flange on the elbow may conveniently be formed integral therewith, whereas the flange 3 on the tube is threadably secured thereto, and thus separable therefrom so as to facilitate assembly and disassembly if it should become necessary to withdraw one or more of the straight tube sections from its associated jacket.

As indicated, jackets generally indicated at 4 are provided around the straight sections of the tube, these jackets being in the form of tubes of slightly larger diameter than the work tube 1, carrying the material to be treated. Adjacent one end of the work tube, the jacket is provided with an inlet tube 5, and at the opposite end of the work tube, the jacket is provided with a discharge 6. Couplings 7 interconnect the several jackets on the straight sections of the work tube so that there may be a continuous flow of coolant from the inlet 5 to the discharge 6. It will be noted that the flow of coolant is preferably counter to the direction of flow of the work material for most efficient heat transfer between the coolant and the work material.

An extension 8 on one end of the work tube leads to a suitable source of work material supply, such as a pump, which is of sufficient capacity to force the material being treated through the work tube.

On of the principal features of my invention is that I entrain, in spaced relation in the stream of material being treated, solid bodies which are of such size as to substantially close the passage through the work tube. In the modification of the invention illustrated in the drawing these solid objects are balls, and conveniently so, since the work tube is a cylinder. There are various ways in which these solid objects, such as balls, may be introduced in spaced relation into the stream of material being treated, one such means being illustrated in the drawing and consisting of a feed tube 9 connected to one side of the work tube 1, such feed tube 9 leading to a hopper 10. Where the said tube 9 opens in to the work tube 1, an annular gasket member 11 of U-shaped cross-section is provided, the inside diameter of which is slightly less than the diameter of the balls, and with the open face of the gasket facing the material being treated which is under pressure. The balls may be fed at regularly spaced intervals into the work tube 1 by means of a plunger operated by a fluid cylinder 12 with the supply of balls to the work tube regulated by a feed wheel 13, or the plunger 12 may be omitted and the feed wheel 13 relied upon to force the balls periodically into the work tube 1.

As the balls reach the discharge end 14 of the work tube 1, they are returned to the hopper 10 by means of the return tube 15, and the treated material is discharged through the branch outlet 16. Separation of the balls and treated material is effected in the following manner. The discharge opening leading through the wall of the work tube 1 into the branch outlet 16 is slightly smaller than the diameter of the balls. Such opening permits the fluid treated material to be forced into the branch outlet tube 16, and since the balls cannot pass into such outlet tube, they are forced around through the return tube 15 into the hopper 10. The resistance to the passage of the balls upwardly through the return tube 15 is sufficiently greater to the resistance of the treated material flowing outwardly through the branch outlet tube 16, so that substantially all of the treated material takes the latter course, rather than following along with the balls up to the hopper 10.

From the foregoing description of one form of apparatus comprising my invention, it will be observed that the effect of the solid particles, such as the balls which are entrained in the stream of flowable material, is to disrupt generally the streamline flow of the material through the work tube; to break up the adherent film on the inner surface of the work tube; and to generally impart a turbulent flow under such conditions such as low velocity which would ordinarily result in streamline flow. As previously indicated, it is virtually impossible with certain materials to increase the velocity of the stream to a point where the turbulence created therein is effective to remove substantially, or any part of, the work material which adheres to the inner periphery of the work tube. A notable example of this is in the manufacture of lubricating greases and other materials where there is a substantial change in viscosity of the material due, for example, to a change in temperature as the material progresses through the work tube. Thus, in the manufacture of a lubricating grease, the grease in a highly heated and very fluid state would be admitted to the work tube at the upper end thereof, and the grease gradually cooled and solidified as it progresses downwardly through the work tube to the discharge end thereof. As the grease is cooled, of course, solidification takes place where cooling first occurs which is on the inner surface of the work tube. This, not only accentuates the streamline flow in that a layer of solidified grease is built up on the inner periphery of the work tube, but also makes it virtually impossible to practically increase the velocity of the stream to such a point where the turbulent character of the stream itself would be effective to break up the film adhering to the inner surface of the work tube. The process and apparatus comprising my invention is, therefore, particularly applicable to the treatment of materials wherein a heat transfer is effected, and particularly in the manufacture of greases.

The process comprising my invention has a further utility in the manufacture of lubricating greases. Most lubricating greases require some "working" either during, or subsequent to, solidification upon cooling in order that the grease may have the proper uniform consistency in the cooled state in which it is used. By entraining the balls in the stream of grease and by having the diameter of such balls only slightly less than the inside diameter of the work tube, the balls scrape off the grease which has been solidified, thoroughly admix the same with that portion which has not yet solidified, and, in the latter stages of the process, effect a thorough working of the grease concurrent with the final cooling stages so that when the grease is discharged it is in proper condition for immediate packaging.

As previously indicated, my improved method and apparatus is suitable for the purpose of establishing turbulent flow in any stream of flowable material established in a restricted conduit. The various advantages to be secured from such turbulent flow have already been pointed out. Other advantages will appear to those familiar with the art, and will not be enumerated in greater detail.

The illustration and described apparatus comprising my invention, and by which the process of my invention may be carried forth, is, of course, only one of the various means which may be employed for this purpose. For example, many different types of expedients may be employed for the purpose of introducing the balls to and removing them from the work tube. My invention is, therefore, not to be limited to any particular means for introducing and removing the balls or similar solid objects. It will be observed that it is not necessary, in carrying out my process, that the work tube be jacketed as shown in the drawing. And furthermore, instead of having an individual jacket for each turn of the work tube, the entire bank of turns may be immersed in a suitable heat transfer medium.

The spacing of the balls, as well as their relative size as compared with the inside diameter of the work tube, will vary in accordance with the characteristics of the material being treated. For certain materials, the balls will be found to produce best results when in widely spaced relation, and in other instances, they should be relatively closely spaced even to the point of touching. For certain types of use, the balls may, as indicated, be introduced so that they touch each other in passing through the work tube. When the process comprising my invention is carried out in this fashion, a different means than that described herein may be employed for the purpose of effecting a flow of the work stream through the work tube. Thus, for example, it is within the contemplation of my invention to mechanically force the balls through the tube while they are in contact with each other, and to rely entirely on the energy imparted to the balls themselves for the purpose of carrying the work stream along therewith. This will be found of particular utility where a very heavy viscous material is being treated, and where such material is of the type which may not be readily handled by a conventional pump for the purpose of imparting the force thereto necessary to cause the same to flow through the work tube.

It is also within the contemplation of my invention to modify the normal course or progress of the balls as they move along entrained in the stream of work material. This may be accomplished by positioning an annular electro-magnet about the work tube and by forming the balls of magnetic material. As the balls move into the zone surrounded by the electromagnet, they virtually become the armature of the magnet and, depending upon the degree of energization of the magnet, will resist being moved out of their position centrally of the electro-magnet. In this way, the normal passage of the balls through the work tube, and while entrained in the stream of work material, may be either retarded or accelerated. Then again, by arranging the work tube as an annulus about a rotor, a travelling magnetic field may be employed for the purpose of moving the balls of magnetic material through the work tube, and such expedient utilized as the only force, or as an auxiliary force in moving the balls through the work tube.

Other modes of applying the principle of the invention may be employed, change being made as regards the details described, provided the features stated in any of the following claims or the equivalent of such be employed.

I therefore particularly point out and distinctly claim as my invention:

1. In the process of modifying the temperature of material, the step of causing a stream of such material to flow through an elongated conduit while having entrained therein a plurality of solid objects effective to break up the adherent film of such material on the inner surface of the conduit such film normally affecting the heat transfer through the walls of the conduit.

2. In the process of treating thermo plastic material, the step of causing a stream of the material to flow through an elongated passage with the material as introduced in a fluid state and as discharged in a semi-solid state, such stream having entrained therein foreign solids of such size as to substantially close said passage.

3. In the process of treating material wherein the same undergoes a substantial change in viscosity coincidental with a substantial change in temperature, the step of causing a stream of such material to flow through an elongated passage while having entrained therein foreign solid objects of such size as to substantially close said passage and simultaneously substantially changing the temperature and accordingly the viscosity of such stream.

4. In the process of manufacturing grease, the steps of causing a stream of the grease to flow through an elongated passage, the grease at the point of introduction being substantially fluid and at the point of discharge substantially solid, such stream having entrained therein foreign solid objects of such size as to substantially close said passage.

MEAD CORNELL.